(12) United States Patent
Larsson

(10) Patent No.: US 6,201,315 B1
(45) Date of Patent: Mar. 13, 2001

(54) WIND POWER MOTOR

(75) Inventor: Olle Larsson, Farsta (SE)

(73) Assignee: Olle Larsson Construktion AB, Farsta (SE)

( * ) Notice: Subject to any disclaimer, the term of this patent is extended or adjusted under 35 U.S.C. 154(b) by 0 days.

(21) Appl. No.: 09/399,776

(22) Filed: Sep. 21, 1999

(30) Foreign Application Priority Data

Sep. 30, 1998 (SE) ................................................... 9803316

(51) Int. Cl.⁷ ........................................................... F03D 9/00
(52) U.S. Cl. ........................................... 290/55; 416/132 B
(58) Field of Search .................... 290/55, 44; 416/223 B, 416/132 B, 189, 177, 9

(56) References Cited

U.S. PATENT DOCUMENTS

| 4,963 | * | 2/1847 | Armstrong et al. | 416/189 |
|---|---|---|---|---|
| 104,918 | * | 6/1870 | St. Clair | 416/9 |
| 663,337 | * | 12/1900 | Gemmill | 416/189 |
| 2,106,928 | * | 2/1938 | Lee | 416/178 |
| 2,137,559 | * | 11/1938 | Algee | 416/189 |
| 3,924,966 | * | 12/1975 | Taminini | 416/177 |
| 4,086,026 | | 4/1978 | Tamanini | 416/177 |
| 4,147,472 | * | 4/1979 | Kling | 416/193 R |
| 4,543,041 | * | 9/1985 | French et al. | 416/183 |
| 4,547,124 | * | 10/1985 | Kliatzkin et al. | 416/86 |
| 5,112,195 | * | 5/1992 | Cox | 416/223 B |

FOREIGN PATENT DOCUMENTS 29 09 781    9/1980 (DE).

* cited by examiner

*Primary Examiner*—Joseph Waks
(74) *Attorney, Agent, or Firm*—Nixon & Vanderhye P.C.

(57) ABSTRACT

A wind power motor comprises a rotor drum having a circumferential drum wall forming an open air inlet end and an open air outlet end. The drum wall has a wing profile-like axial cross-section, so that the drum wall is thicker at the air inlet end than at the air outlet end. A plurality of vanes are attached to the rotor drum. Each vane has a front end and a rear end, which is displaced in the circumferential direction of the rotor drum relative to the front end, so that the vane acts on the rotor drum with a torque when wind is blowing against the air inlet end of the rotor drum and hits the vane.

20 Claims, 2 Drawing Sheets

WIND POWER MOTOR

BACKGROUND AND SUMMARY OF THE INVENTION

The present invention relates to a wind power motor of the type having radial vanes.

There is a need for inexpensive wind power motors, which are easy to install, for operating electric generators, which are to power small power consumers on locations where the public electric mains are not available, for example on smaller islands, in sparsely populated areas, in developing countries etc. The traditional type of wind power motors including a propeller and currently available on the market, however, is relatively expensive to use for producing electricity, because an expensive gearbox has to be arranged between the relatively slowly rotating propeller shaft and the electric generator. In addition, a sturdy tall framework has to be provided capable of supporting the gearbox and the generator, which are usually mounted at top of the framework to avoid long power reducing transmissions.

A wind power motor of the type having radial vanes is disclosed in U.S. Pat. No. 4,086,026.

An object of the present invention is to provide a new wind power motor of the radial vane type, which is inexpensive, easy to install, has a high efficiency and is capable of directly operating an electric generator of standard type without need for any intermediary gearbox.

Accordingly, the present invention provides a wind power motor comprising a framework; a substantially horizontal rotor shaft journalled on the framework; a rotationally symmetrical rotor drum having a circumferential direction and rigidly connected to the rotor shaft coaxially with the latter, the rotor drum having a circumferential drum wall forming an open air inlet end and an open air outlet end, the drum wall having a wing profile-like axial cross-section, with the drum wall thicker at the air inlet end than at the air outlet end; and at least one vane attached to the rotor drum and having a front end and a rear end, which is displaced in the circumferential direction of the rotor drum relative to the front end. The vane acts on the rotor drum with a torque about the rotor shaft when wind is blowing against the air inlet end of the drum wall and hits the vane. This wing profile-like drum wall is aerodynamically beneficial, which results in a low air resistance at the air outlet end of the rotor drum, so that the wind power motor of the invention will have a high efficiency. That is the efficiency is increased compared to if a wing profile-like drum wall were not provided.

According to a preferred embodiment of the invention each vane comprises a straight front portion extending from the front end of the vane substantially axially along the rotor drum, and a curved rear portion curving from the straight portion to the rear end of the vane. This results in the advantage that power reducing air turbulence between adjacent vanes is substantially avoided. The displacement in the circumferential direction of the rotor drum between the front and the rear end of at least one of the vanes may advantageously be adjustable, so that the attack angle of the vane against the wind can be adjusted to the prevailing wind force. The adjustment of the vane to the wind force may suitably be achieved by adjusting the rear end of the vane in the circumferential direction of the rotor drum.

In accordance with another embodiment of the invention, the wind power motor comprises a tubular further rotor shaft coaxially journalled on the rotor shaft, a further rotationally symmetrical rotor drum, which is smaller than and arranged within the rotor drum and which is rigidly connected to the further rotor shaft coaxially with the latter, and a plurality of further vanes attached to the smaller rotor drum. Each further vane has a front end and a rear end, which is displaced in the circumferential direction of the smaller rotor drum relative to the front end of the larger rotor drum. Since the smaller rotor drum has a shorter diameter than the larger rotor drum it requires a relatively small torque for its rotation, which makes it suitable to utilize for relatively weak winds. Hereby, the wind power motor may be operated by relatively strong as well as relatively weak winds.

In principal, the further vanes on the further smaller rotor drum may be designed like the vanes on the larger rotor drum. However, preferably at least one of the further vanes extends radially out from the smaller rotor drum and axially along a portion of the latter, and at least one of the vanes extends radially from the larger rotor drum into the latter and axially along another portion of the smaller rotor drum, the last mentioned vanes of the two rotor drums radially overlapping each other.

DETAILED DESCRIPTION OF THE DRAWINGS

Figure 1:
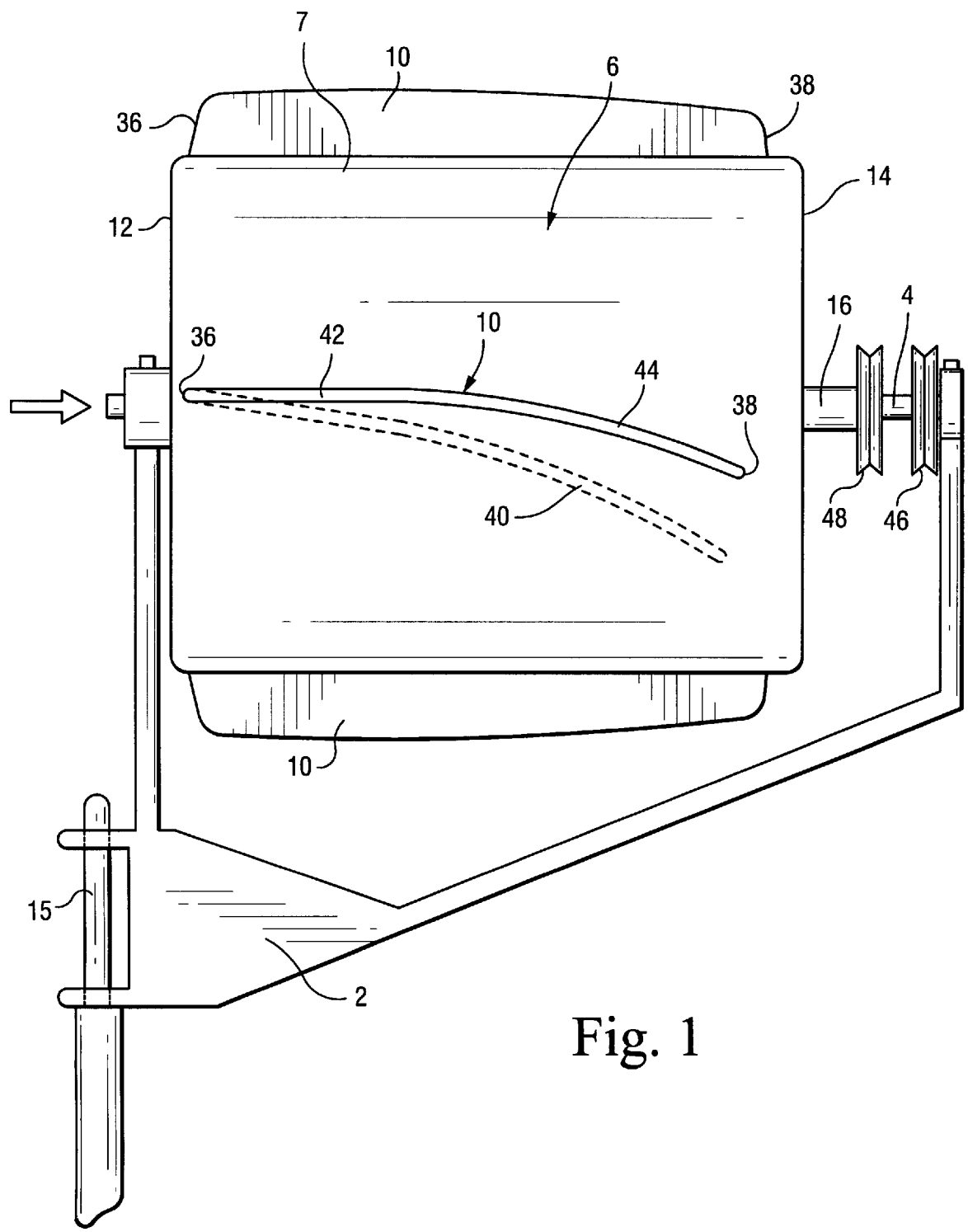
FIG. 1 shows a side view of a wind power motor according to the invention including two coaxial rotor drums, one within the other.

FIG. 1 shows a wind power motor according to the invention comprising a framework 2. a rotor shaft 4 journalled on the framework 2, and a substantially cylindrical rotor drum 6, which by means of spokes 8 is rigidly connected to the rotor shaft 4 coaxially with the latter. Four elongated external vanes 10 extend radially out from the rotor drum 6 and are evenly distributed on the latter in the circumferential direction of the rotor drum 6. The rotor drum 6 has an air inlet end 12, which is to be directed against the wind direction, and an air outlet end 14 where the air leaves the rotor drum 6. An arrow 16 indicates the wind direction relative to the rotor drum 6. The framework 2 is pivoted about a vertical shaft 15 at the air inlet end 12 of the rotor drum 6.

A cylindrical rotor shaft 16 is applied on the rotor shaft 4 and is rotatable relative to the latter. At the air outlet end 14 the rotor drum 6 is provided with four spokes 18, which are journalled on the rotor shaft 16 by a bearing 20. A cylindrical rotor drum 22, which is shorter than the rotor drum 6 and which has a shorter diameter than the latter, is rigidly connected to the rotor shaft 16 by spokes 24. The two rotor drums 6, 22 have circumferential drum walls 7 and 23, respectively. Each drum wall 7,23 has a wing profile-like axial cross-section, such that the drum wall 7,23 is thicker at the air inlet end 12 than at the air outlet end 14.

Also the smaller rotor drum 22 is provided with four elongated vanes 26 extending radially inwardly from the rotor drum 22 and evenly distributed on the latter in the circumferential direction of the rotor drum 22. Four other shorter vanes 28 extend radially out from the smaller rotor drum 22 and axially along an initial portion 30 of the latter, as seen in the direction of wind flow. The initial portion 30 of the rotor drum 22 constitutes about half the length of the rotor drum 22. The larger rotor drum 6 is provided with four further vanes 32 extending radially inwardly from it and axially along a terminating portion 34 of the smaller rotor drum 22, the vanes 28 and 32 overlapping one another.

Each vane 10, 26, 28, 32 has a front end 36 and a rear end 38, which is displaced in the circumferential direction of the rotor drum 6 and 22, respectively, relative to the front end 36, so that the vane acts on the rotor drum with a torque when wind is blowing against the air inlet end 12 and hits the vane. As an alternative, the position of the rear end 38 of each vane on the rotor drum may be adjustable in the circumferential direction of the rotor drum, as indicated in FIG. 1 showing a vane 40 with broken lines forming a greater attack angle against the air stream. Each vane 10, 26, 28, 32 comprises a straight front portion 42 extending from the front end 36 of the vane axially along the rotor drum and a curved rear portion 44 curving from the straight portion 42 to the rear end 38. The axial extension of each outer vane 10 of the larger rotor drum 12 is at least twice as large as the distance between the vane 10 and the rotor shaft 4.

In the example of the wind power motor according to the invention shown in the figures, the diameter of the larger rotor drum 6 is about 1.5 m and the length of the rotor drum 6 about 1.7 m. With these dimensions the wind power motor will be suitable for powering relatively small power consumers to a reasonable price. However, it should be emphasized that the wind power motor according to the invention very well may be designed in substantially larger sizes for powering relatively high power consumers, if desired.

The rotor shafts 4 and 16 are provided with respective belt pulleys 46 and 48 for connection to for instance an electric generator.

Figure 2:
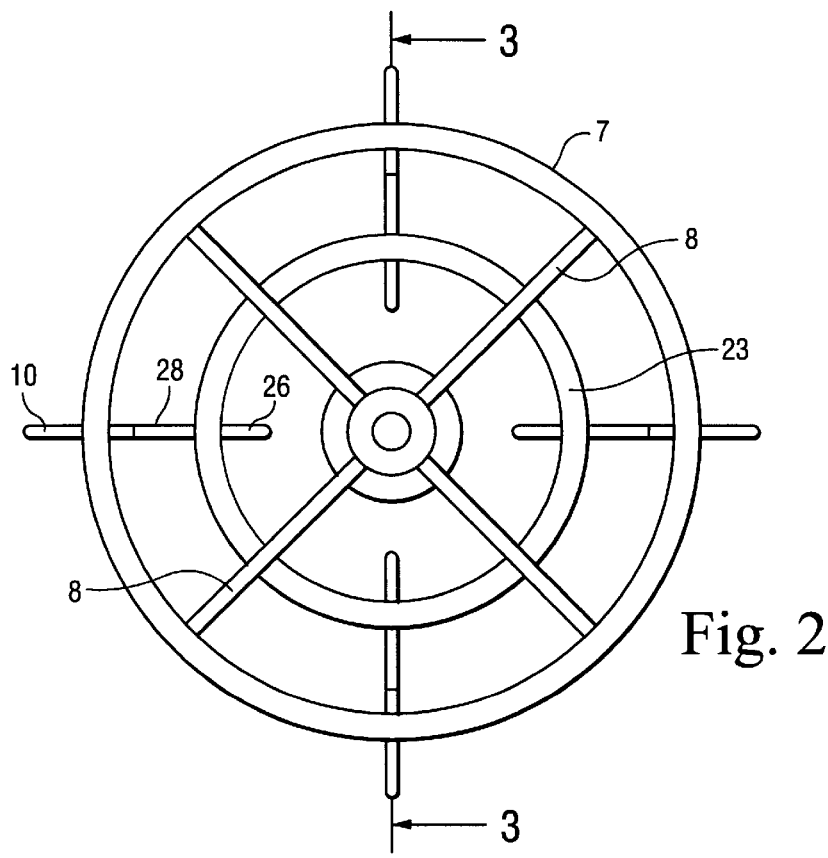
FIG. 2 shows a front view of the two rotor drums of the wind power motor according to FIG. 1.
Figure 3:
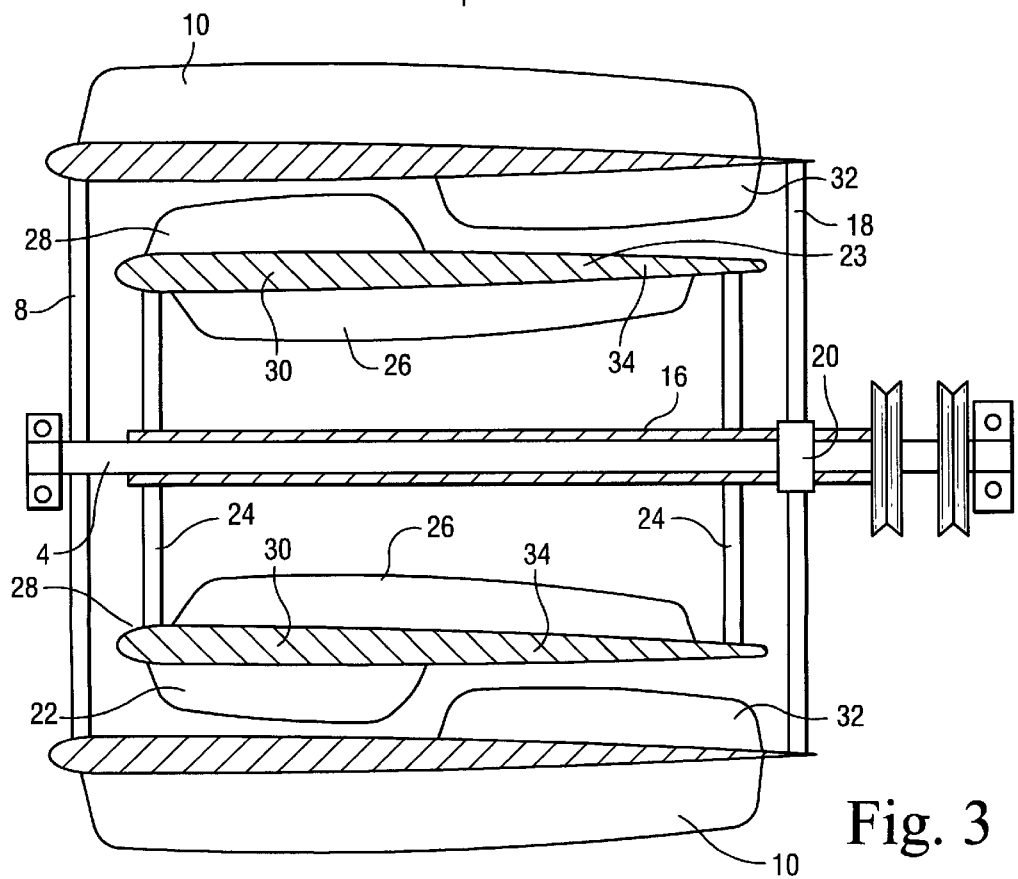
FIG. 3 is a longitudinal cross-sectional view along the line III—III of FIG. 2.

In the wind power motor according to FIGS. 1–3 the smaller rotor drum 22 of course may be eliminated if the wind conditions are good. In such a case the internal vanes 32 can be made as long as the external vanes 10. The number of vanes on the respective rotor drums may also be varied. For instance, there may be more of the external vanes 10 on the larger rotor drum 6 than the internal vanes 32.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A wind power motor, comprising:
    a framework;
    a substantially horizontal first rotor shaft journalled on said framework;
    a rotationally symmetrical first rotor drum having a circumferential direction and rigidly connected to said first rotor shaft coaxially therewith, said first rotor drum having a circumferential first drum wall forming an open air inlet end and an open air outlet end;
    a substantially horizontal second rotor shaft coaxially journalled on said first rotor shaft;
    a rotationally symmetrical second rotor drum having a circumferential direction and rigidly connected to said second rotor shaft coaxially with said second rotor shaft, and arranged within said first rotor drum, said second rotor drum having a circumferential second drum wall forming an open air inlet end and an open air outlet end;
    at least one first vane attached to said first rotor drum and having a front end and a rear end, which is displaced in the circumferential direction of said first rotor drum relative to said front end; and
    at least one second vane attached to said second rotor drum and having a front end and a rear end, which is displaced in the circumferential direction of said second rotor drum relative to said front end of said second rotor drum, so that said first vane and said second vane, respectively, act on said first rotor drum and said second rotor drum, respectively, with a torque about said first rotor shaft and second rotor shaft, respectively, when wind is blowing against said air inlet end of said first drum wall and said second drum wall, respectively, and hits said first vane and said second vane, respectively.

2. The wind power motor according to claim 1, wherein said first drum wall and said second drum wall, respectively, each have a wing shaped axial cross-section, such that said first drum wall and said second drum wall, respectively, are thicker at said air inlet end than at said air outlet end thereof.

3. The wind power motor according to claim 2 wherein said wing shaped drum wall is mounted so that said wing shaped drum wall is aerodynamically beneficial, resulting in a low air resistance at the air outlet end of said rotor drum, so that the efficiency of said wind power motor is increased compared to if a wing shaped drum wall were not provided.

4. The wind power motor according to claim 2 wherein said at least one vane comprises a plurality of vanes.

5. The wind power motor according to claim 2, wherein said second vane extends radially out from said second rotor drum and axially along a portion of the latter and said first vane extends radially inwardly in said first rotor drum and axially along another portion of said second rotor drum, said first and second vanes radially overlapping each other.

6. The wind power motor according to claim 2, wherein said first vane and second vane, respectively, comprises a straight front portion extending from said front end of said first vane and second vane, respectively, substantially axially along said first rotor drum and second rotor drum, respectively, and a curved rear portion curving from said straight portion to said rear end of said first vane and second vane, respectively.

7. The wind power motor according to claim 2, wherein there is displacement between said front and rear ends of said first vane, and wherein said first vane is adjustably attached to said first rotor drum to allow adjustment of the displacement between said front and rear ends of said first vane in the circumferential direction of said first rotor drum.

8. The wind power motor according to claim 7, wherein said rear end of said first vane is adjustably displaced in the circumferential direction of said first rotor drum relative to said front end of said first vane.

9. The wind power motor according to claim 1, wherein said second vane extends radially out from said second rotor drum and axially along a portion of the said second rotor drum, and said first vane extends radially inwardly in said first rotor drum and axially along another portion of said second rotor drum, said first and second vanes radially overlapping each other.

10. The wind power motor according to claim 9 wherein said at least one vane comprises a plurality of vanes.

11. The wind power motor according to claim 9, wherein said first vane and second vane, respectively, comprises a straight front portion extending from said front end of said first vane and second vane, respectively, substantially axially along said first rotor drum and second rotor drum, respectively, and a curved rear portion curving from said straight portion to said rear end of said first vane and second vane, respectively.

12. The wind power motor according to claim 9, wherein there is displacement between said front and rear ends of said first vane, and wherein said first vane is adjustably attached to said first rotor drum to allow adjustment of the displacement between said front and rear ends of said first vane in the circumferential direction of said first rotor drum.

13. The wind power motor according to claim 12, wherein said rear end of said first vane is adjustably displaced in the circumferential direction of said first rotor drum relative to said front end of said first vane.

14. The wind power motor according to claim 1, wherein said first vane and said second vane, respectively, comprises a straight front portion extending from said front end of said first vane and said second vane, respectively, substantially axially along said first rotor drum and said second rotor drum, respectively, and a curved rear portion curving from said straight portion to said rear end of said first vane and said second vane, respectively.

15. The wind power motor according to claim 14 wherein said at least one vane comprises a plurality of vanes.

16. The wind power motor according to claim 14, wherein there is displacement between said front and rear ends of said first vane, and wherein said first vane is adjustably attached to said first rotor drum to allow adjustment of the displacement between said front and rear ends of said first vane in the circumferential direction of said first rotor drum.

17. The wind power motor according to claim 1, wherein there is displacement between said front and rear ends of said first vane, and wherein said first vane is adjustably attached to said first rotor drum to allow adjustment of the displacement between said front and rear ends of said first vane in the circumferential direction of said first rotor drum.

18. The wind power motor according to claim 17, wherein said rear end of said first vane is adjustably displaced in the circumferential direction of said first rotor drum relative, to said front end of said first vane.

19. The wind power motor according to claim 17 wherein said at least one vane comprises a plurality of vanes.

20. The wind power motor according to claim 1 wherein said at least one vane comprises a plurality of vanes.

* * * * *